United States Patent [19]
Stewart

[11] Patent Number: 5,876,778
[45] Date of Patent: Mar. 2, 1999

[54] FAT IMITATOR AND PROCESS FOR ITS PRODUCTION

[75] Inventor: Peter Stewart, Ingersoll, Canada

[73] Assignee: 1129143 Ontario Inc., Ingersoll, Canada

[21] Appl. No.: 792,646

[22] Filed: Jan. 31, 1997

[51] Int. Cl.$^6$ ................................................. A23L 1/0522
[52] U.S. Cl. .................... 426/508; 426/519; 426/523; 426/549; 426/634; 426/637; 426/656; 426/804; 426/658; 127/65; 127/66; 127/67
[58] Field of Search ...................................... 426/506, 507, 426/508, 509, 510, 511, 44, 804, 637, 634, 549, 523, 519, 512, 656, 658; 127/65, 66, 67

[56] References Cited

U.S. PATENT DOCUMENTS

| | | | |
|---|---|---|---|
| Re. 34,508 | 1/1994 | Murtaugh | 426/804 |
| 3,769,038 | 10/1973 | Mitchell | 426/549 |
| 3,968,268 | 7/1976 | Sair | 426/506 |
| 4,510,166 | 4/1985 | Lenchen | 426/579 |
| 4,844,935 | 7/1989 | Fere | 426/549 |
| 4,908,223 | 3/1990 | Murtaugh | 426/804 |
| 5,188,674 | 2/1993 | Kasuca | 127/69 |
| 5,281,432 | 1/1994 | Zallie | 426/549 |
| 5,296,253 | 3/1994 | Lusas | 426/549 |
| 5,318,635 | 6/1994 | Kasuca | 127/69 |
| 5,344,663 | 9/1994 | Jewell | 426/549 |
| 5,387,426 | 2/1995 | Harris | 426/573 |
| 5,393,550 | 2/1995 | Tarr | 426/804 |
| 5,435,851 | 7/1995 | Kasuca | 127/69 |
| 5,470,391 | 11/1995 | Mallee | 127/38 |
| 5,547,513 | 8/1996 | Mallee | 426/578 |
| 5,554,402 | 9/1996 | Smith | 426/549 |
| 5,576,048 | 11/1996 | Hauber | 426/578 |
| 5,584,937 | 12/1996 | Finocchcarro | 127/38 |
| 5,614,243 | 3/1997 | Dunn | 426/578 |
| 5,631,032 | 5/1997 | Gel | 3426/549 |
| 5,676,994 | 10/1997 | Eskins | 426/602 |
| 5,720,822 | 2/1998 | Jeffcoat | 127/65 |
| 5,759,581 | 6/1998 | Baensche | 424/489 |

OTHER PUBLICATIONS

Arbuckle 1972 Ice Cream 2nd Edition AVI Publishing Westport CT, Inc pp. 96–105.

*Primary Examiner*—Carolyn Paden
*Attorney, Agent, or Firm*—Rogers & Milne

[57] ABSTRACT

A process for producing a fat imitator by combining a complex carbohydrate, a simple carbohydrate, a proteinaceous material, a gum or hydrocolloid polycarbohydrate and a salt. The complex carbohydrate may be a whole, dehulled cereal grain, legume seed or plant tuber. The simple carbohydrate may be a sugar solid or sugar syrup. The proteinaceous material contains a minimum protein content of 20% weight as determined by 6.25% times nitrogen content. The gum or hydrocolloid polycarbohydrate may be of vegetable, algal, animal or bacterial origin. The salt may be a sodium or potassium chloride, phosphate, acetate, citrate, lactate, gluconate, or an ammonium phosphate, acetate, citrate, lactate, gluconate or combinations of the foregoing salts.

14 Claims, No Drawings

FAT IMITATOR AND PROCESS FOR ITS PRODUCTION

FIELD OF THE INVENTION

The present invention relates to food ingredients for producing fat and calorie-reduced products which imitate existing fat containing foods and which may be used as additives or replacements for fat containing foods.

Examples of "fat containing foods" includes gravies, soups, sauces, salad dressings, icings and bakery fillings, ice-cream and yogurt type products, mayonnaise, cooked cheeses such as mozzarella, soft cheeses including edam and brie, hard cheeses including swiss, cheddar, provolone and processes cheeses and spreads, baked goods like cakes, cookies, biscuits, muffins, and processed meats such as pepperoni, hot dogs, sausage, kielbossa etc.

BACKGROUND OF THE INVENTION

Many products have been developed to serve as fat replacements when added to already existing foods, or as mimics or analogues of already existing foods. The purpose of such products is to produce fat and calorie-reduced food products. Rarely however do such products duplicate or imitate the appearance, taste, texture, mouthfeel and performance characteristics of existing fat containing foods.

It is an object of the present invention to provide a process for making a fat replacement ingredient the results of which are readily reproduced, which process can accommodate a wide range of compositions in order to suit each particular food application as desired.

It is a further object of the present invention to provide a fat replacement ingredient which is easy to manufacture, versatile and makes possible the preparation of a dry solid food product which may be relatively instantly reconstituted with water to form a fat and calorie replacement system which can then serve as an analogue to already existing foods or may be added to already existing foods, without significantly altering the aforementioned performance characteristics of such foods.

It is yet a further object of the present invention to provide food analogues which are easy to manufacture, exhibit superior quality and performance characteristics, are available in a number of conveniently used forms, and which according to alteration of the processing method and the ratios of ingredients or elements employed can be engineered to meet the performance requirements of any foods to which they are intended to be added or which they are intended to replace.

SUMMARY OF THE INVENTION

A process for producing a fat imitator comprising the steps of:

(i) adding water to a complex carbohydrate which is a member selected from the group consisting of a whole, dehulled cereal grain, legume seed and plant tuber; to produce a mixture containing an amount from between about 33% and about 88% by weight; water;

(ii) heating the mixture resulting from step (i) to a temperature of about 100° C.; and holding the mixture at about 100° C. for a period of between about 20 and about 40 minutes; to produce a cooked mixture;

(iii) shearing the cooked mixture resulting from step (ii) using a high shear mixer for a period of between about 3 and 15 minutes until the mixture consists essentially of particles having a size of less than 2000 microns; to produce a sheared product;

(iv) adding a simple carbohydrate which is a member selected from the group consisting of sugar solid, powdered sugar, crystalline sugar and sugar syrup to the sheared product resulting from step (iii) and blending said simple carbohydrate into said sheared product to produce a blended mixture;

(v) cooling said blended product resulting from step (iv) to a temperature of less than about 57° C. but greater than 40° C. to produce a cooled blended mixture;

(vi) adding to said cooled blended mixture resulting from step (v) a proteinaceous material having a minimum protein content of about 20% by weight as determined by 6.25 times % N; at least one member selected from the group consisting of sodium chloride, sodium phosphates, sodium acetates, sodium citrates; sodium lactates, sodium gluconates, potassium phosphates, potassium acetates, potassium citrates, potassium lactates, potassium gluconates, calcium chloride, calcium phosphates, calcium carbonate, calcium sulphonate, calcium acetate, calcium lactate, calcium citrate, calcium gluconate, ammonium phosphate, ammonium acetate, ammonium citrate, ammonium lactate and ammonium gluconate, and a member selected from the group consisting of a gum and a hydrocolloid polycarbohydrate of vegetable, algal, animal or bacterial origin to form a final mixture;

(vii) cooling said final mixture resulting from step (vi) to a temperature of from about 20° C. to about 40° C. to produce a cooled final mixture;

(viii) transferring and encapsulating said cooled final mixture resulting from step (vii) into a suitable receptacle selected from the group consisting of molds, casings and containers to produce an encapsulated product; and, (ix) refrigerating said encapsulated product resulting from step (viii) to a temperature of from about 0° C. to about 10° C.

DESCRIPTION OF PREFERRED EMBODIMENTS

The process of the present invention utilizes five principle elements or ingredients. The primary element of the present invention is a dehulled uncooked cereal grain, legume seed, or plant tuber, principally containing starches and other complex carbohydrates, such as cellulose and hemi-cellulose which may also contain lesser amounts of protein. The primary element may include any of the following used alone or together in combination: rice (white or brown); barley (pot or pearl); wheat (whole, durum, or triticale); corn (yellow, white or hybrid); rye; buckwheat or Kasha; millet; spelt (whole); oat; sorghum; quinoa; amaranth; kamut; a legume seed including pea, bean, lentil, or chickpea; or a plant tuber such as arrowroot, tapioca, or potato.

Any of the foregoing may be in a dry, low moisture content, dehulled, whole granular, or cracked form, or less preferably may also be in the form of a dry meal or flour.

The second element or ingredient of the present invention is a simple carbohydrate or sugar, in dry powder or crystalline form, or in aqueous liquid syrup form, and may include any of the following used alone or in combination: sucrose; glucose (dextrose); fructose; maltose; lactose; galactose; polydextrose; dextrins or cyclodextrins; sugar syrups or sugar syrup solids, including honey, corn syrup, rice syrup, maple syrup, liquid invert syrup, molasses, fruit juice concentrate, sorbitol, sorbitol solution, mannitol or lactitol.

The third element or ingredient of the present invention is an animal or vegetable protein source other than a whole grain, legume, or plant tuber, in dry, low moisture content, cooked or uncooked, powdered or granular form, which preferably has a protein content greater than 20% by weight, which also preferably is an acid-precipitated form of protein which has not been denatured by cooking or has preferably not been previously subjected to temperatures in excess of 57° C. during its preparation prior to use in the present invention. The protein source may include any of the following used alone or in combination: soya protein flour, concentrate or isolate; pea, bean or lentil protein flours or concentrates; grain protein flours and concentrates, including rice, corn, wheat, oat, barley or other grains; milk or whey protein concentrates or isolates; dehulled and defatted whole nut meat protein flours, concentrates or isolates, including for example, those derived from peanut, pumpkin seeds, sesame seeds, cashews, almonds, walnuts, pecans, Brazil nuts, filberts or hazelnuts; defatted wheat germ, corn germ or other cereal germ protein flours and concentrates; defatted or whole mustard seed meal, cottonseed meal, or flax meal; corn gluten or wheat gluten; yeast protein extracts; and protein extracts of bacterial cultures.

The fourth element of the present invention is a water soluble hydrocolloid or gum, of vegetable, algal, bacterial or animal origin, in a dry, low moisture content, powdered or granular form, which is principally composed of complex polycarbohydrates with lesser amounts of protein. Where the hydrocolloid is anionic in nature, it is principally in a sodium salt form which is readily soluble in water. The fourth element or ingredient may include any of the following used alone or in combination; seaweed extracts, including agar; alginates; Irish moss; carrageenin; plant and seed exudates and extracts, including acacia, ghatti, karaya, tragacanth, Arabic, guar, locust bean, flax gum; oat or barley beta-glucans; konjac seed flour or mannan tuber; pectin (from fruits); bacterial gums, including gellan, dextran, rhamsan, welan, xanthan or derivatives of any of the preceding gums, including for example, propylene glycol alginate and hydroxy propyl guar; cellulose derivatives, including methyl cellulose, hydroxy ethyl cellulose, hydroxy propyl cellulose, hydroxy propyl methyl cellulose, carboxymethyl cellulose; starch derivatives, including oxidized starch, starch acetate, starch phosphate, starch succinate, hydroxy ethyl or hydroxy propyl starch; and animal gums, including for example, egg white or albumin and gelatine.

The fifth element or ingredient of the present invention is a mineral salt which is principally sodium chloride or table salt in a dry, powder or granule form, or in the form of a concentrated solution, and may include any of the following used alone or together with salt or in combination: potassium chloride; sodium or potassium phosphates; citrates, lactates, acetates; calcium salts, including chloride, carbonate, sulphate, phosphates, lactate, acetate, gluconate; and ammonium salts, including acetate, citrate, lactate and phosphates.

The process of the present invention may be modified by replacing or substituting the aforementioned first element or ingredient which is a cereal grain, legume seed, or plant tuber, by combining a purified starch or high starch content food source together with a non-starchy complex carbohydrate food source which contains a high level of cellulose or hemi-cellulose fibre in a non-metabolizable suitable ratio.

As can be seen from the above list of ingredients, most of the elements or ingredients have a low fat content. By way of example, the hydrocolloid, protein and salt contain virtually no fat or fat levels which are generally less than 1% by weight. The cereal grains, legume seeds and plant tubers may contain some fat, however, this is usually present at levels of less than 5% by weight. Similarly, defatted cereal brans, germs, soya flours or nut meats generally contain less than 5% by weight fat by virtue of having been defatted. Where a whole seed such as mustard seed, cottonseed, sesame seed or flax seed might be used to prepare analogues, since they are whole and have not been defatted, such elements may contain up to 40% fat. However, the formulas for analogues set out in the examples below which include mustard seed, cottonseed, sesame seed or flax incorporate levels of usage of these elements or ingredients in amounts which are not sufficiently high enough to contribute significant levels of fat to the formulas so that the analogues prepared accordingly would still function as fat reducers or fat replacers.

The first step of the process of the present invention involves combining the complex carbohydrate with water in a ratio ranging from one part by weight water to two parts by weight of the first ingredient to four parts by weight water to one part by weight of the first ingredient. In the first step, the mixture of water and primary ingredient is heated to boiling (ie; 100° C. or 212° F.) and the mixture is held at this temperature for a period of between 20 and 40 minutes. During this time, the water added to the ingredient will become completely absorbed by the ingredient and the element itself will become fully cooked and gelatinized, and will appear semi-translucent.

The first ingredient, now being fully cooked and in the hot, soft, semi-fluid, and gelatinous state, as compared to the hard and brittle nature of the original element, is sheared and finally ground using appropriate mechanical means, such as a high shear mixer, for a period of between 5 and 15 minutes, in order to reduce the size of substantially all of the particles within the mixture to a maximum of 2,000 microns or 2 millimetres. The grinding or shearing action should be sufficient to rupture substantially all of the cells present within the original material and to release the complex carbohydrate cellulose and hemicellulose content of the cell walls, and also the starch granules and proteinaceous matter from within the cells into the mixture. The grinding or shearing action should also be sufficient to rupture free starch granules thereby freeing up a portion of the cooked granules as free and linear starch molecules in solution within the mixture.

The cooking and particularly the shearing action during the first stage of the process is an important aspect of the present invention.

To the cooked and sheared product resulting from the first step, the second ingredient, which is a simple carbohydrate or sugar is added. The simple carbohydrate or sugar may be added to the mixture while it is still hot. The second ingredient is incorporated simply by blending it into the sheared product without the use of grinding or high shear, using appropriate mechanical means, to form a smooth paste-like mixture.

The amount of the second ingredient added may vary from between about 15 parts to about 400 parts by weight which results in a blended mixture containing between about 5% and about 40% of the sugar solids or syrup by weight. The second ingredient (ie; simple carbohydrate) may be added in the form of a crystalline or powdered sugar or in the form of a liquid sugar syrup containing between about 50% and about 80% sugar solids by weight.

Where a stiffer or higher viscosity product is required, the sugar is preferably added in the form of a dry powder solid at a high level of use, or as a liquid syrup at a low level of use. Where a less stiff or lower viscosity product is required, the sugar is preferably added as a liquid syrup at a high level of use or as a solid at a low level of use. Where the element use is a solid sugar, it is preferable to add it to the sheared product produced in step 1 that is still warm having a temperature of from about 50° C. to about 100° C. as heat from the sheared product will help dissolve the sugar permitting it to be incorporated more easily. The second ingredient is incorporated simply by blending it into the sheared product without the use of grinding or high shear, using appropriate mechanical means, to form a smooth paste-like mixture.

The purpose of adding the second ingredient is to adjust the flow and texture of the blended mixture, as well as to contribute to a synergistic reaction which takes place between all of the ingredients added according to the balance of the process.

The blended mixture resulting from step 2 may be further processed in one of two ways. The mixture may be allowed to cool to a temperature of 57° C. or less with the remaining three ingredients added together with non-essential ingredients such as flavourings, colourings and acidulants to form a final mixture. The final mixture may then be cooled to a temperature of from about 20° C. to about 40° C. to produce a cooled final mixture. The cooled final mixture may be transferred and encapsulated using any suitable molds, casings or containers to produce an encapsulated product.

should also be in dry powder or granulated form using the above described range of compositions with respect to the amount of each ingredient added.

In either the spray dried or non-spray dried process, the three remaining ingredients may be pre-blended or may be added individually, one at a time.

The final product of the spray dried method is a dry, free-flowing powder, which when reconstituted with water is capable of being formed into an analogue suitable for use as a replacement for high fat content food products or as a fat imitator, or when added to existing foods directly or to other food recipes, it is capable of forming analogues of desirable performance characteristics. Similar to the analogues prepared according to the non-spray dried method of the invention, the dry powder analogues may be recooked or fully cooked after reconstitution and before consumption.

According to the non-spray dried process, the final mixture resulting from the addition of the remaining three ingredients will congeal, gel or set after being refrigerated for a suitable period of time. The products may then be used as analogues to replace existing fat containing products or as add-ons to existing food products and recipes, in order to form analogues.

The following table illustrates the composition ranges of analogue formulas which it is possible to prepare by combining the five principal ingredients and non-essential ingredients according to the process of the present invention:

| Elements | At a Maximum Level of Usage of Element One | | | At a Minimum Level of Usage of Element One | | |
|---|---|---|---|---|---|---|
| | Parts by Weight | % of Stage 1 Mixture | % of Total Formula | Parts by Weight | % of Stage 1 Mixture | % of Total Formula |
| Water | 100 | 33% | 31% | 400 | 80% | 24%* |
| Element 1-Cereal Grain | 200 | 66% | 62% | 100 | 20% | 6% |
| Sub-Total | 300 | 100% | 93% | 500 | 100% | 30% |
| Element 2-Sugar | 16 | | 5 | 670 | | 40 |
| Element 3-Protein | 1.5 | | 0.5 | 170 | | 10 |
| Element 4-Hydrocolloid | 1.5 | | 0.5 | 170 | | 10 |
| Element 5-Salt | 1.5 | | 0.5 | 85 | | 5 |
| Non-Essential Elements, Colour, Flavour | 1.5 | | 0.5 | 85 | | 5 |
| TOTAL FORMULA | 322 parts | | 100% | 1680 parts | | 100% |

*Water content in the final analogue may vary between 20% and 80% by weight, depending on quantities of the remaining two elements added to the stage 1 mixture.

Preferably, the encapsulated product is then refrigerated to a temperature of from about 0° C. to about 10° C.

Alternatively, the blended mixture resulting from step 2 may be diluted with water to form a slurry of suitable consistency to permit the blended product to be transported using suitable mechanical equipment and fed into spray nozzles under pressure in order to be spray dried. The water added is preferably hot and has a temperature of between about 70° C. and about 100° C. in order to reduce energy requirements and to improve efficiency during spray drying. The amount of water to be added to the product for such purposes can vary, in order to yield a slurry containing from between about 5% solids and 95% water to about 25% solids and 75% water. The slurry is spray dried to a moisture content of between about 3% and about 18% moisture.

To the spray dried powder are added the remaining three ingredients and further non-essential ingredients which The process and products of the present invention are further illustrated in the examples set out below which describe the results of various recipes incorporating the products resulting from the process of the present invention. The product resulting from the process of the present invention is referred to as "mimix" in the examples.

EXAMPLE 1

Almond Paste

Overview: A high starch content material and complex carbohydrate source was used to replace the primary element that is a cereal grain, legume seed, or plant tuber.

A pregelatinized white navy bean starch obtained by air classification of whole ground navy beans, containing 65% starch by weight was pre-blended with a dry, powdered beet fibre obtained from sugar beet extraction, in a ratio of two parts bean starch to one part ground beet fibre. The mixture totalling three parts solids was added to seven parts water and agitated to thoroughly wet and disperse the solids. The mixture thus formed which was a high viscosity paste was heated to 100 degrees Centigrade and held at this temperature for 25 minutes while agitating gently. The fully cooked mixture was then sheared using high speed agitation for 5 minutes. To the mixture was then added 2 parts corn fructose syrup containing 70% sugar solids, and the syrup blended in thoroughly using a low rate of agitation. The resulting mixture was then cooled to a temperature of 50 degrees Centigrade. To the cooled mixture was then added 1 part of an almond protein isolate containing 90% protein by weight prepared by acid precipitation of oil extracted almond meal, pre-blended together with 0.1 parts locust bean gum, 0.1 parts egg albumin, and 0.05 parts of a 50/50 mixture of potassium mono and diphosphates. After blending these, a lesser amount of tumeric and annatto food colouring, and an almond oil extract were added and the mixture thoroughly blended. The resulting mix was cooled to a temperature of 30 degrees Centigrade and transferred into glass jars which were then sealed. The jars were then refrigerated for several hours at 5 degrees Centigrade. The resulting product set to a highly viscous mass on cooling, and contained less than 1% fat by weight. The product had a calorie content of only 135 calories per 100 grams as compared to a sweetened full fat almond spread which contained over 400 calories per 100 grams. The product was used to replace the original almond spread and successfully imitated the original food in appearance, taste, texture, and mastication properties.

EXAMPLE 2

Low Calorie Yogurt Substitute

Whole, cracked oat groats in the amount of 2 parts were added to 8 parts water and the mixture heated to 100 degrees Centigrade and held at this temperature for 40 minutes while gently agitating. The fully cooked and translucent porridge-like mixture was then sheared using a high rate of agitation for 15 minutes. To the sheared mixture was then added 2 parts of rice syrup and 1 part maltodextrin which were incorporated by low speed agitation. To the resulting mixture was then added an additional 30 parts water, followed by 1 part skim milk solids preblended with 0.2 parts gellan gum. Following this addition, 0.2 parts of lactic acid powder containing 60% lactic acid absorbed on 40% calcium lactate pentahydrate was added, followed by a similar amount of liquid vanilla extract added as a flavouring. The mixture, then being at a temperature of 37 degrees Centigrade was poured into plastic containers which were sealed, and the product was refrigerated for several hours at 5 degrees Centigrade. The resulting products exhibited a body characteristic of yogurt type products, were similar in taste and texture, and contained less than 1% fat by weight, and had a caloric value of only 45 calories per 100 grams as compared to 60 calories for an equivalent weight of a normal yogurt product.

EXAMPLE 3

Spray dried powder, designed as a slow setting, low calorie yogurt replacement, to be reconstituted with water The mixture of Example 2, obtained by blending rice syrup and maltodextrin with fully cooked and sheared oat groats was diluted using an additional 12 parts water, to yield a manageable slurry containing 18% solids by weight. The slurry was then spray dried to a moisture content of 8% by weight. To each 10 parts of spray dried solids was added 2 parts skim milk solids pre-blended with 0.5 parts carrageenin, 0.2 parts calcium diphosphate anhydrous, 0.4 parts glucono delta lactone, and 0.1 parts ground vanilla bean powder, and the resulting dry powder mixture blended well. The resulting blend, when reconstituted with warm water at a ratio of 90 parts water to 10 parts solids blend, yielded a slow setting yogurt type product which could be filled into containers before setting. The products after refrigeration served as low calorie yogurt substitutes.

EXAMPLE 4

Pepperoni Sausage

An analogue was prepared by combining Pearl barley which was dehulled with 2 parts water to 1 part barley and heating at 100 degrees Centigrade (212 degrees Fahrenheit) until all the water was absorbed and the barley was soft. The fully cooked product was sheared until smooth (approximately 2 minutes) then sugar solids were added and mixed until smooth. Soy protein Isolate was added at 1–13%, deheated ground mustard seed at 1–15% and salt at 0.51–6% of total weight (depending on sodium level desired in finalized product). The finished analogue was stuffed into containers and refrigerated to a holding temperature of 4 degrees Centigrade (34 degrees Fahrenheit). If the product was to be used within 14 days it would typically not be frozen. If the product was to be kept for a longer period, the product would be frozen and held at 10 degrees Centigrade. The analogue could be treated like any other frozen meat product. The analogue was then formulated in a "Pepperoni Sausage" which compared to a standard formula pepperoni sausage as follows:

| 1. | Standard Formula: | |
|---|---|---|
| | Lean Pork Trimmings (85% lean) | 24.0 |
| | Lean Beef Product (75% lean) | 10.0 |
| | Fat Pork Trimmings (30% lean) | 30.0 |
| | Binder and Seasonings | 6.0 |
| | Water | 30.0 |
| | | 100.0 |
| | Cooking Shrinkage 10% | |
| | Fat percentage in cooked product 30% | |
| 2. | Revised Formula: | |
| | Lean Pork Trimmings (85% lean) | 28.0 |
| | Lean Beef Product (75% lean) | 10.0 |
| | Fat Pork Trimmings (30% lean) | 6.0 |
| | Analogue (99.3% lean) | 20.0 |
| | Binder and Seasonings | 6.0 |
| | Water | 30.0 |
| | | 100.0 |
| | Cooking Shrinkage 10% | |
| | Fat percentage in cooked product 10% | |
| | Reduction of fat % by 66% | |
| | Fat per 1 ounce serving (28 grams) less than 3 grams | |
| | Product labelled "low fat" | |

EXAMPLE 5

Analogue Base

White rice was combined with water at 2 parts water to 1 part rice and cooked until all the water was absorbed and the rice was soft. The cooked mixture was sheared until smooth. Additional water and maltodextrin at 1–40% of total weight was added to mixture. Soy protein isolate was added at 1–13%, gelatine was added at 1–8% and salt was added at 2–4% of total weight. The base was stuffed in containers and refrigerated to a holding temperature of 40 degrees Centigrade (34 degrees Fahrenheit). If the product was to be used within 14 days it would be held refrigerated. If longer shelf life was required the product would be frozen at 20 degrees Centigrade (10 degrees Fahrenheit).

EXAMPLE 6

"Savory Spread"—Using Analogue Base

A base as described in Example 5 was used to prepare a "non-dairy" spread. The base was placed in a process cheese cooker (Twin or single auger, jacketed and/or steam injected). The base was heated and agitated until smooth (175 degrees Fahrenheit). Flavour, colour and carrageenin gum were added with additional water (% dependant upon required viscosity) and processed until completely homogenous. Product for slicing was molded in 5 lb. blocks or alternatively filled into 250 to 750 ml jars. The finished product contained less than 0.3% fat, no lactose, and tasted and spread like a cheddar cheese sauce or spread.

EXAMPLE 7

Pie Crust Blend

Using an analogue base as described in Example 5 a pastry was made containing less than 10% fat as compared to a "standard formula" set out below.

| 1. | Standard Formula: | |
|---|---|---|
| | Flour | 38.0 |
| | Shortening | 40.0 |
| | Water | 20.0 |
| | Salt | 2.0 |
| | | 100.0 |
| | Shrink | 15% |
| | Fat | 47% |
| 2. | Analogue Formula | |
| | Flour | 44.0 |
| | Analogue | 36.0 |
| | Shortening | 8.0 |
| | Water | 10.0 |
| | Salt | 2.0 |
| | | 100.0 |
| | Shrink | 15% |
| | Fat | 9.4% |
| | Serving of crust per serving 1 oz. 28 grams | |
| | Fat per serving less at 3 "low fat" | |

EXAMPLE 8

Analogue Base

An analogue was prepared by combining dehulled white rice with 2 parts water 1 part rice and heated at 100 degrees Centigrade until the water was absorbed and the rice was soft. Additional water and maltodextrin at 1–40% of total weight was added to the mixture. The product was sheared until smooth. Soy protein isolate was added at 1–13%, xanthan gum at 0.2–4%, gelatin at 0.5–10%, and salt at 0.1–3% by total weight. The analogue was stuffed into containers and refrigerated to a holding temperature of 4 degrees Centigrade. The analogue was used as a replacement for cheese in mozzarella, cheddar, provolone, etc.

EXAMPLE 9

Mozzarella/Analogue Blend

The analogue of Example 8 above was placed in a cooker and heated until smooth (175 degrees Fahrenheit). It was then blended by positive forward displacement with mozzarella curd and processed as a conventional mozzarella cheese from this point onward. The analogue was added to the mozzarella cheese at levels from 25% to 75% depending upon the fat level required and usage of the finished product.

The above description is intended in an illustrative rather than a restrictive sense. Variations to the exact description may be apparent to persons skilled in the relevant arts without departing from the spirit and scope of the present invention as defined by the claims set out below.

I claim:

1. A process for producing a fat imitator comprising the steps of:

(i) adding water to a complex carbohydrate which is a member selected from the group consisting of a whole, dehulled cereal grain, legume seed and plant tuber; to produce a mixture containing an amount from between about 33% and about 88% by weight; water;

(ii) heating the mixture resulting from step (i) to a temperature of about 100° C.; and holding the mixture at about 100° C. for a period of between about 20 and about 40 minutes; to produce a cooked mixture;

(iii) shearing the cooked mixture resulting from step (ii) using a high shear mixer for a period of between about 3 and 15 minutes until the mixture consist essentially of particles having a size of less than 2000 microns; to produce a sheared product;

(iv) adding a simple carbohydrate which is a member selected from the group consisting of sugar solid, powdered sugar, crystalline sugar and sugar syrup to the sheared product resulting from step (iii) and blending said simple carbohydrate into said sheared product to produce a blended mixture;

(v) cooling said blended product resulting from step (iv) to a temperature of less than about 57° C. and greater than 40° C. to produce a cooled blended mixture;

(vi) adding to said cooled blended mixture resulting from step (v) a proteinaceous material having a minimum protein content of about 20% by weight as determined by 6.25 times % N; at least one member selected from the group consisting of sodium chloride, sodium phosphates, sodium acetates, sodium citrates; sodium lactates, sodium gluconates, potassium phosphates, potassium acetates, potassium citrates, potassium lactates, potassium gluconates, calcium chloride, calcium phosphates, calcium carbonate, calcium sulphonate, calcium acetate, calcium lactate, calcium citrate, calcium gluconate, ammonium phosphate, ammonium acetate, ammonium citrate, ammonium lactate and ammonium gluconate, and a member selected from the group consisting of a gum and a hydrocolloid polycarbohydrate of vegetable, algal, animal or bacterial origin to form a final mixture;

(vii) cooling said final mixture resulting from step (vi) to a temperature of from about 20° C. to about 40° C. to product a cooled final mixture;

(viii) transferring and encapsulating said cooled final mixture resulting from step (vii) into a suitable receptacle selected from the group consisting of molds, casings and containers to produce an encapsulated product; and, (ix) refrigerating said encapsulated product resulting from step (viii) to a temperature of from about 0° C. to about 10° C. wherein no oil or fat is added as an ingredient.

2. A process according to claim 1, wherein said final mixture has a pH of less than about 5.5.

3. A process according to claim 2, wherein said proteinaceous material is added in the form of an acid precipitated protein concentrate or isolate derived from a source which is a member selected from the group consisting of animal, vegetable and plant seed.

4. A process according to claim 1, wherein said proteinaceous material is added in the form of an acid precipitated protein concentrate or isolate derived from a source which is a member of the group consisting of animal, vegetable and plant seed.

5. The product resulting from the process of claims 1, 2, 4 or 3.

6. A process according to claims 1, 2, 4 or 3, including the further step of adding at least one member selected from the group consisting of a flavouring and a colourant.

7. The product resulting from the process of claim 6.

8. A process according to claim 1, wherein:
(a) step (v) is replaced with the step of diluting said blended mixture resulting from step (iv) with water to form a slurry of suitable consistency for spray drying and spray drying said slurry to a moisture content of from about 3% to about 18% by weight;
(b) said proteinaceous material, mineral salt, gum and hydrocolloid polycarbohydrate are in step (vi) in a dry, powdered or free-flowing granular form;
(c) steps (vi) through (ix) are eliminated; and,
(d) said final mixture is a dry powder mixture capable of being reconstituted as a fat imitator by the addition of water.

9. A process according to claim 8, wherein when said final mixture is reconstituted with water the resulting reconstituted mixture has a pH of less than about 5.5.

10. A process according to claim 9, wherein said proteinaceous material is added in the form of an acid percipitated protein concentrate or isolate derived from a source which is a member selected from the group consisting of animal, vegetable and plant seed.

11. A process according to claim 8, wherein said proteinaceous material is added in the form of an acid percipitated protein concentrate or isolate derived from a source which is a member of the group consisting of animal, vegetable or plant seed.

12. A process according to claims 8, 9, 11 or 10, including the further step of adding at least one member selected from the group consisting of a flavouring and a colourant.

13. The product of the process according to claim 12.

14. The product resulting from the process of claims 8, 9, 11 or 10.

* * * * *